(12) United States Patent
Dragic

(10) Patent No.: US 8,750,655 B1
(45) Date of Patent: Jun. 10, 2014

(54) BRILLOUIN SCATTERING FIBER

(76) Inventor: Peter Dragic, Champaign, IL (US)

( * ) Notice: Subject to any disclaimer, the term of this patent is extended or adjusted under 35 U.S.C. 154(b) by 156 days.

(21) Appl. No.: 13/481,023

(22) Filed: May 25, 2012

Related U.S. Application Data

(60) Provisional application No. 61/519,596, filed on May 25, 2011.

(51) Int. Cl.
- *G02B 6/00* (2006.01)
- *G01J 5/08* (2006.01)
- *G01D 5/353* (2006.01)
- *G02B 6/02* (2006.01)
- *G01D 5/26* (2006.01)

(52) U.S. Cl.
CPC *G01D 5/353* (2013.01); *G02B 6/02* (2013.01); *G01D 5/268* (2013.01)
USPC ............. 385/13; 385/123; 385/141; 385/142; 385/144; 250/227.14; 250/227.18

(58) Field of Classification Search
CPC ......... G01D 5/353; G01D 5/268; G02B 6/02; C03C 13/045; C03C 13/046
USPC ............. 385/12–13, 123, 126–127, 141–145; 250/227.14, 227.18; 356/32
See application file for complete search history.

(56) References Cited

U.S. PATENT DOCUMENTS

| | | | |
|---|---|---|---|
| 6,698,919 B2* | 3/2004 | Chi et al. | 374/45 |
| 8,553,211 B2* | 10/2013 | Jaaskelainen | 356/73.1 |
| 2004/0258378 A1* | 12/2004 | Sasaoka et al. | 385/123 |

* cited by examiner

*Primary Examiner* — Uyen Chau N Le
*Assistant Examiner* — Michael Mooney
(74) *Attorney, Agent, or Firm* — Carmen Patti Law Group, LLC

(57) ABSTRACT

An optical fiber may be constructed of a material having at least first and second constituents. The constituents and their relative abundance are selected such that the aggregate Brillouin frequency-shift response exhibited by a fiber constructed using the combined material is insensitive to a selected physical condition, such as temperature or strain, or the sensitivity is below an acceptable application-specific level, over an acceptable range of conditions. The constituents are selected such that the slopes or derivatives of the Brillouin frequency-shift response (with respect to the selected physical condition) of two of the constituents have opposite signs, and are combined in proper quantities such that the constituents balance each other to reduce the slope or derivative of the aggregate Brillouin frequency-shift response of the combined material to zero, or to an acceptable application-specific level, over an acceptable range of conditions.

20 Claims, 5 Drawing Sheets

BRILLOUIN SCATTERING FIBER

CROSS-REFERENCE TO RELATED APPLICATIONS

This application claims the benefit of U.S. Provisional Patent Application Ser. No. 61/519,596, filed May 25, 2011, entitled "BRILLOUIN SCATTERING FIBER."

TECHNICAL FIELD

The present application relates to the field of optical fibers. More particularly, the present application relates to the field of optical fibers exhibiting a Brillouin frequency shift having a modified, reduced or controlled sensitivity with respect to one or more physical conditions.

BACKGROUND

Brillouin back-scattering (BBS) in optical fiber may be used as a tool for many applications, including but not limited to, the sensing of local temperature and/or strain. The frequency shift associated with BBS is a function of both the temperature (T) and strain ($\sigma$) applied to an optical fiber. If a pulse of light is sent down a fiber and time-gated returns are analyzed with respect to what was launched, the distribution of frequency shifts as a function of distance can be determined. This frequency shift is usually influenced by both the strain and temperature effects which co-exist in a fiber. Thus, to distinguish the local temperature from the strain, two fibers can be employed which have differing responses to each of strain and temperature. This gives rise to a system of two equations and two unknowns, from which the individual strain or temperature can be determined. Alternatively, a fiber can be specially-sleeved in a loose manner to remove strain effects and measure just a local temperature. Both approaches lead to more expensive and complex measurement systems.

SUMMARY OF THE INVENTION

An optical fiber may be constructed of a material having at least first and second constituents. The first constituent may be considered a primary material. Other constituents may be considered dopants. The constituents and their relative abundance are selected such that the aggregate Brillouin frequency-shift response exhibited by a fiber constructed using the combined material is insensitive to a selected variable physical condition, such as temperature or strain, or the sensitivity is below an acceptable application-specific level, over an acceptable range of conditions.

More specifically, each constituent alone exhibits a respective Brillouin frequency-shift response. The constituents of the material are selected such that the slopes or derivatives of the Brillouin frequency-shift response (with respect to the selected variable physical condition) of two of the constituents have opposite signs. In addition, the constituents are combined in proper quantities such that the constituents balance each other's contribution to the aggregate Brillouin frequency-shift dependency (with respect to the selected selected variable physical condition), so as to reduce the slope or derivative of the aggregate Brillouin frequency-shift response (with respect to the selected variable physical condition) of the combined material to zero, or to an acceptable application-specific level, over an acceptable range of conditions.

The fiber may be constructed of regions of different materials. At least one of these materials has constituents that are selected and combined in proper quantity such that the constituents balance each other's contribution to the aggregate Brillouin frequency-shift dependency (with respect to the selected selected variable physical condition), so as to reduce the slope or derivative of the aggregate Brillouin frequency-shift response (with respect to the selected variable physical condition) to zero, or to an acceptable application-specific level, over an acceptable range of conditions.

BRIEF DESCRIPTION OF THE DRAWINGS

Features of example embodiments of the invention will become apparent from the description, the claims, and the accompanying drawings in which:

DETAILED DESCRIPTION

Figure 1:
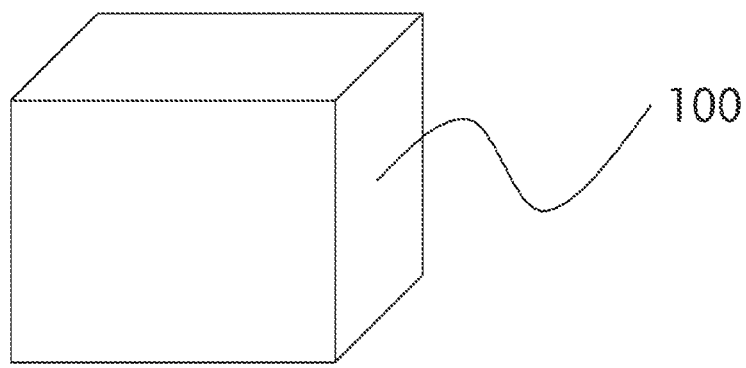
FIG. 1 is a simplified view of a block of bulk material which may be used to construct optical fiber.

FIG. 1 is a simplified representation of a block of a first bulk material 100 that may used to construct optical fiber. Although the term "optical" is used herein and in the literature to describe the types of fibers in conjunction with which aspects of the present invention may be used, one of skill in the art will appreciate that optical fiber also propagates mechanical or acoustic energy and that these modalities may interact. The term "optical" herein contemplates electromagnetic energy at various wavelengths and is not restricted to those visible to humans.

Figure 2:
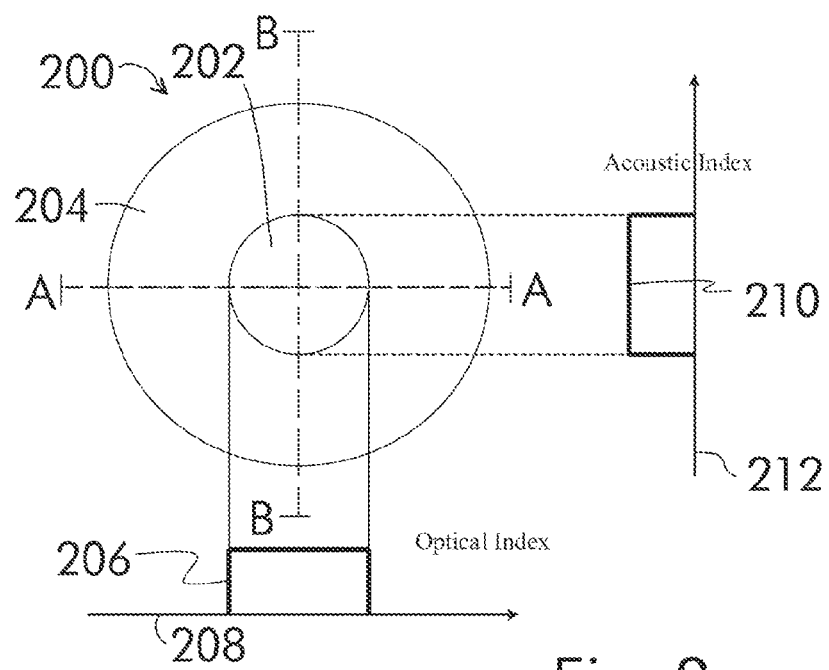
FIG. 2 is cross-sectional view of an optical fiber having an optical core and an acoustic core.

FIG. 2 is a cross-sectional view of an example fiber 200 of known construction, in essence looking down a longitudinal axis of the fiber. In typical fibers, there is provided at least an inner region 202, referred to as the "core," and a surrounding outer region 204, referred to as the cladding ("inner" and "outer" expressing relative radial distances from a nominal center of the fiber 200). The core 202 and cladding 204 are respectively constructed of materials having some differences in certain physical properties. The differences in physical properties between the core and cladding define, at least in part, the behavior of the fiber as to its propagation of optical and acoustic energy and the interactions between them. In this respect, key defining physical properties include the refractive or acoustic index of the core and the refractive or acoustic index of the cladding. A material's refractive index with respect to optical energy (the "optical index") may differ from that material's index with respect to acoustic energy (the "acoustic index").

As best seen in FIG. 2, curve 206 shows the relative variation of the optical index at various positions along a diametral cross-section line A-A through the fiber 200. An upward excursion in curve 206 from a baseline 208 indicates an increase in the optical index corresponding to positions in the core 202. Similarly, curve 210 shows the relative variation in the acoustic index at various positions along a diametral cross-section line B-B through the fiber 200. Curve 210 is rotated 90 degrees counter-clockwise from the conventional representation of curve 206, so that a leftward excursion in curve 210 from a baseline 212 indicates an increase in the acoustic index corresponding to positions in the core. While curve 210 shows an increase in the acoustic index corresponding to the acoustic "core", it will be appreciated that a reduction in the acoustic index may also be used to define the acoustic core or other acoustic waveguide structures. As best seen in FIG. 2, the region of elevated optical index defining the optical core is coextensive with the region of elevated acoustic index defining the acoustic core in fiber 200, such that the optical core and the acoustic core are substantially coextensive.

Figure 3:
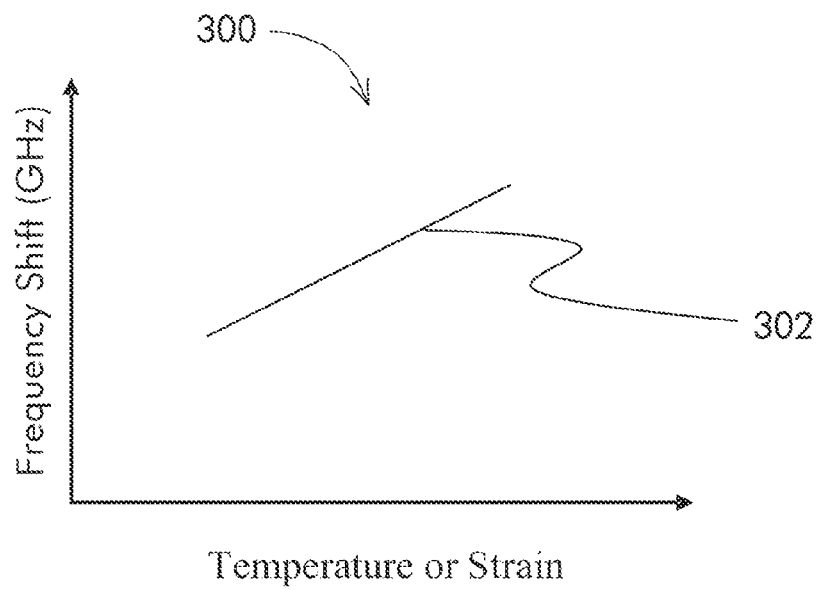
FIG. 3 is a graph showing the Brillouin frequency shift response curve with respect to temperature or strain in a fiber of ordinary design, wherein the slope of the response curve is positive.

Material 100 of FIG. 1 may be used to construct any part of the fiber, including without limitation the acoustic core, the acoustic cladding, the optical core, and the optical cladding. FIG. 3 is a graph 300 showing a typical Brillouin frequency shift response curve 302 with respect to temperature or strain in a fiber of ordinary design, such as Fiber 200 of FIG. 2. The response curve 300 of FIG. 3 has a positive slope (i.e. the Brillouin frequency shift increases with increasing temperature or strain). While the slope may also be negative, it is very rarely zero, or close to zero, for typical glassy materials.

It would be beneficial to have a fiber that is designed such that at least one of its Stokes' frequency shifts associated with Brillouin back-scattering is independent of either the temperature (T) or strain ($\sigma$), or that this dependency is minimized to an acceptable level. (In some systems, a maximum tolerable dependence on temperature and/or strain exists, where the condition of complete immunity is not required.)

Figure 4:
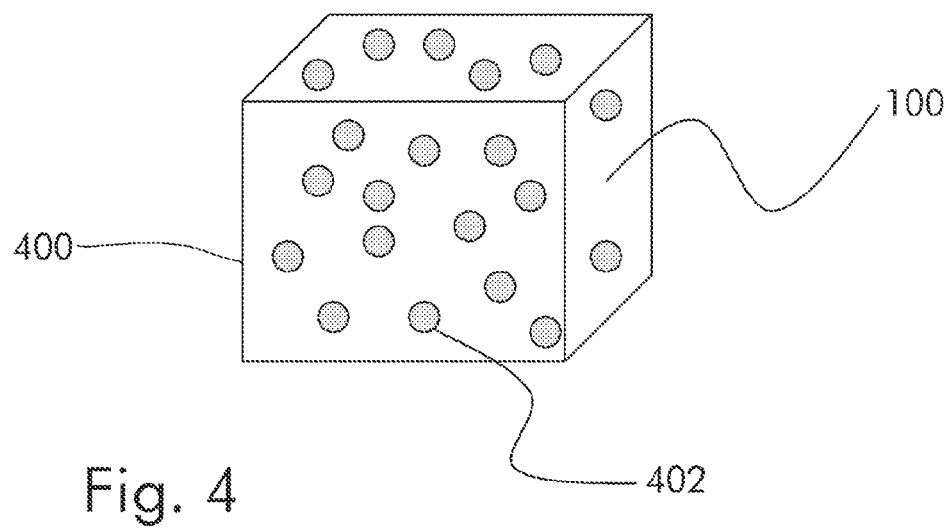
FIG. 4 is a simplified view of a block of bulk material which may be used to construct optical fiber, wherein a dopant is added to a material such as that of FIG. 1 so as to modify properties of the material.

According to an aspect of the present invention, a second material or "dopant" may be added to the first material to modify the aggregate Brillouin frequency shift response of the material mixture used in an optical fiber. FIG. 4 depicts an example combined material 400 including first constituent material 100 as in FIG. 1, and a second constituent material or "dopant" 402. The material 100 and dopant 402 ("constituents") may most commonly be an oxide glass. However, the constituent materials 100 and 402 may be any appropriate type of glass, other amorphous materials, or crystalline materials, having properties suitable for constructing optical fiber. For example, first material 100 could be $SiO_2$, and dopant 402 could be one or more of $GeO_2$, $P_2O_5$, $Al_2O_3$, $B_2O_3$, and F. However, these are examples, and others could be used. While FIG. 4 depicts small spheres of dopant, this is merely one non-limiting example. In other embodiments, the dopant 402 may be completely dispersed in the first material, may exist as small nanoparticle regions of defined or undefined shape, or may be otherwise distributed. Moreover, materials 100 and 402 may be, for example, any glassy, amorphous, non-amorphous, crystalline, or non-crystalline materials. There may also be more than one dopant. In some embodiments, one or more dopants may be other-than-uniformly distributed in a fiber; for example, the dopants may be distributed or segregated in regions, layers, by geometry, in varying gradients, or otherwise.

Figure 5:
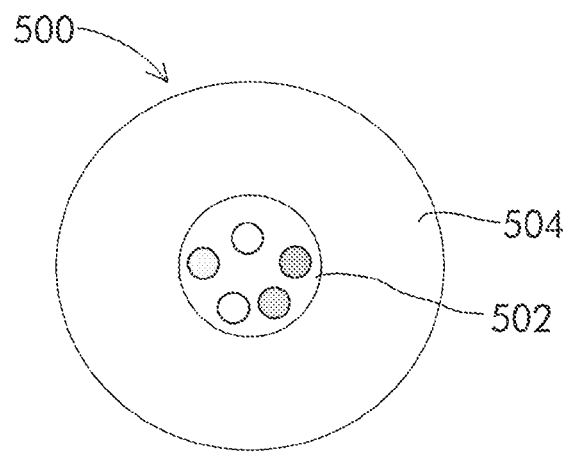
FIG. 5 is a cross-sectional view of an example fiber constructed according to an aspect of the present invention, in which the fiber has a core constructed of a doped material adapted to provide a selected Brillouin frequency-shift response.

FIG. 5 is a cross-section view of an example embodiment of an optical fiber 500 constructed according to an aspect of the present invention. Fiber 500 may generally be constructed in a manner similar to fiber 200 of FIG. 2, with core 202 replaced by a core 502 containing a doped material, such as the doped material 400 of FIG. 4., i.e., including the first constituent material 100 and the dopant constituent material 402. In some embodiments, the core 502 and cladding 504 will be different materials; for example, the core 502 and cladding 504 may have different constituent species, or one or more constituents may have differing abundances. In some embodiments, the core 502 may consist of an undoped material, such as the first material 100 (FIG. 1), and cladding 504 may consist of a doped material 400 (FIG. 4). In some embodiments, both the core 502 and the cladding 504 may be made from different doped materials. In yet another embodiment, the cladding 504 may (or may not) be similar to the core material 402. In yet another embodiment, the optical core 502 and cladding 504 will have similar dn/dT or dn/d$\sigma$ where n is the refractive index. It will be appreciated by one of skill in the art that the optical core 502 and cladding 504 cooperate to define an optical mode. The optical mode exhibits an effective modal index of refraction. Thus, n here refers to the refractive index of the particular optical mode. Acoustic energy is also propagated through fiber 500. An acoustic core (not separately shown) and an acoustic cladding (not separately shown) cooperate to define an acoustic mode, for which there is also an associated acoustic index. In any fiber, the optical core 502, optical cladding 504, acoustic core, and acoustic cladding may generally be considered to be regions in the fiber which cooperate to permit or enable propagation, and define the modes of propagation, of corresponding types or modalities of energy. A fiber may have plural optical cores, plural optical claddings, plural acoustic cores, plural acoustic claddings, and the optical and acoustic regions or structures may or may not be coextensive. Moreover, a fiber may support plural modes of propagation for one or more types or modalities of energy.

Figure 6:
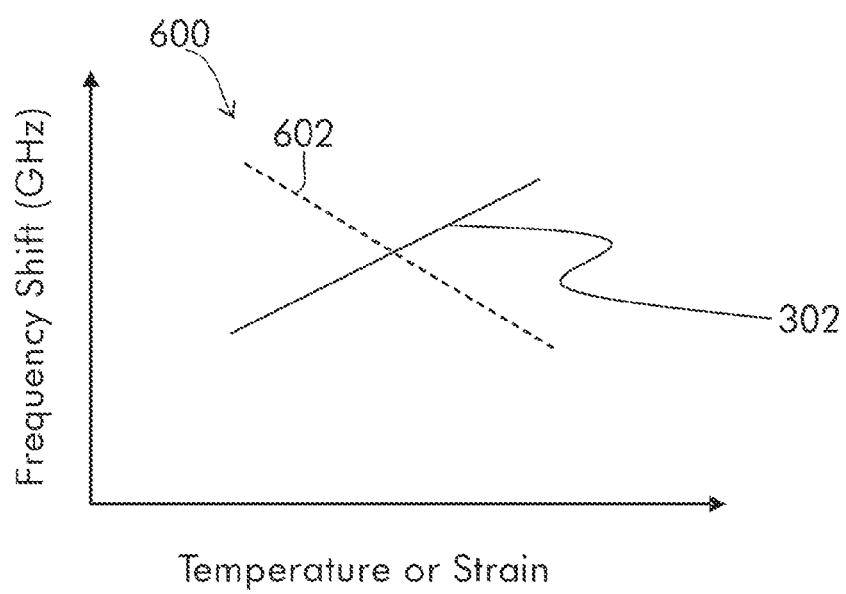
FIG. 6 is a graph showing overlaid the respective Brillouin frequency shift responses, with respect to temperature or strain, of the original material of FIG. 1 and the dopant of FIG. 4, wherein the Brillouin frequency shift response of the dopant has a slope of an opposite sign to that of the slope of the Brillouin frequency shift response of the original material.

Certain dopants, in combination with the original material and in the proper concentration, can decrease the slope of the frequency-versus-temperature or frequency-versus-strain curve of the material mixture used in an optical fiber, as exhibited in the aggregate. FIG. 6 is a graph 600 showing, overlaid, the respective Brillouin frequency shift responses 302 and 602, with respect to a selected variable physical condition, for example but without limitation, temperature or strain, of the original material 100 of FIG. 1 and the dopant 402 of FIG. 4. These slopes may be considered to be the dependence of the Brillouin frequency shift of each constituent material on the selected variable physical condition, e.g., temperature, strain, or the like. While temperature and strain are the most common physical conditions seen to affect Brillouin frequency shift in an optical fiber, other physical conditions could also affect the Brillouin frequency shift. The slope of the Brillouin frequency-vs-temperature or frequency-vs-strain response curve 302 for the first material 100 is positive, while the slope of the Brillouin frequency-vs-temperature or frequency-vs-strain response curve 602 for the dopant is negative.

Figure 7:
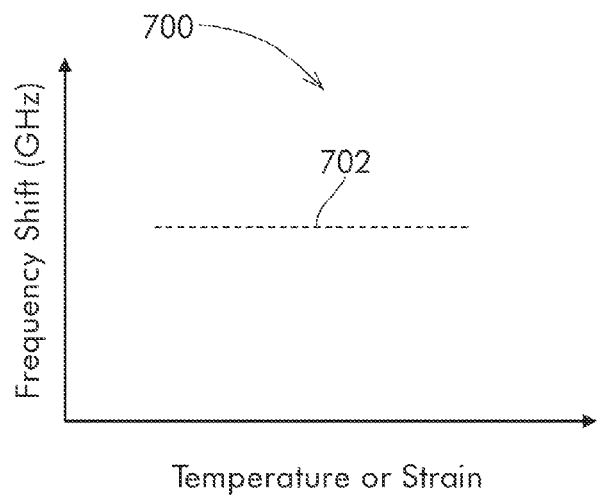
FIG. 7 is a graph showing the aggregate Brillouin frequency shift response of a fiber constructed of a doped material such as that of FIG. 4, i.e., a material including the original material of FIG. 1 and the dopant of FIG. 4.

When the correct amount of dopant 402 is combined with first material 100 to form a doped material 400, the aggregate frequency-versus-temperature or strain curve of the doped material can have a very low slope. In other words, the contribution to the aggregate slope from a constituent material exhibiting a response curve with a negative slope balances the contribution from the constituent material exhibiting a response curve with a positive slope in a way that the net slope is very low. FIG. 7 is a graph 700 representing the aggregate Brillouin frequency shift response or dependency curve 702 of the fiber 500 of FIG. 5, e.g., a frequency-versus-temperature or frequency-versus-strain curve, having a very low slope.

The slopes of curves 302 and 602 of FIG. 6 do not have to have the same magnitude in order to achieve the aforementioned balancing effect of the contributions from the combination of materials which results in an aggregate response curve having low slope. Curves 302 and 602 represent the Brillouin frequency shift responses or dependencies of materials 100 and 402 in bulk, before mixing or combination to form doped material 400. The aggregate Brillouin frequency shift response of doped material 400 will depend on the relative quantity of dopant used, compared to the quantity of the first material, and on the material properties of the dopant 402 and first material 100. Large quantities of dopant 402 (i.e. more than 50 percent by weight) may be necessary to achieve the desired result. (Although the term "dopant" is traditionally used to refer to a substance added in small concentrations to another material, it is used herein to refer to material constituents, other than first material 100, which are added to or combined with first material 100 to alter certain properties of the combined material 400, from those of the first material 100, without regard to the relative amounts of the materials.)

While in FIG. 6, the slope of the response curve 302 for first material 100 is positive, and the slope of the response curve 602 for dopant 402 is negative, this is merely an example. For different constituent materials, the slope of the response curve for the first material could be negative and the slope of the response curve for the dopant could be positive. Also, plural dopants, each with different response curves, could be used. The slopes of the response or dependency curves of at least two of the constituent materials used must be of opposite signs in order for the balancing effect of the slope or dependency contributions from several materials to produce an aggregate response or dependency curve with a desirably low slope.

Figure 8:
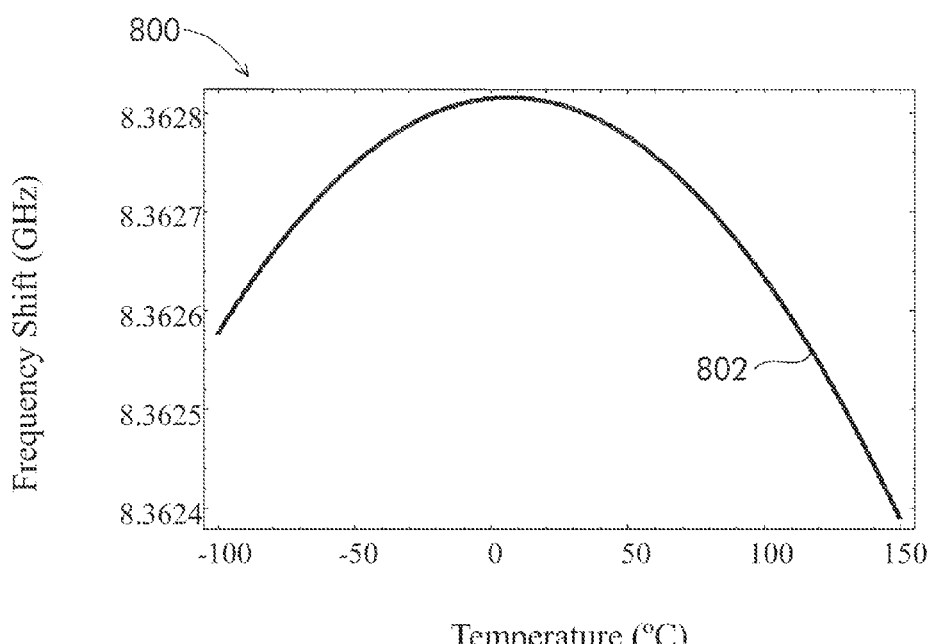
FIG. 8 is a graph showing the Brillouin frequency shift response curve, with respect to temperature, of an example material according to an aspect of the present invention, which may be used to construct optical fiber.

While the response curves of FIGS. 3, 6, and 7 are shown as lines for simplicity, it will be appreciated that the response curves are approximately linear over limited ranges of temperature and strain, and that the balancing of responses to produce desirable aggregate behavior, for particular selections of materials and amounts thereof, may only be effective within limited ranges of temperature and strain. FIG. 8 is a graph 800 showing the Brillouin frequency-shift response curve 802, with respect to temperature, of an example $P_2O_5$-doped silica ($SiO_2$) fiber material, determined according to an aspect of the present invention (discussed further in greater detail), which may be used to construct optical fiber. The correct combination of $P_2O_5$ and $SiO_2$ concentrations has given rise to a temperature range ($-100°$ C.$<$T$<100°$ C.) where the temperature-dependency of the material is minimized to be less than 2 kHz/$°$ C. at 1550 nm.

Figure 9:
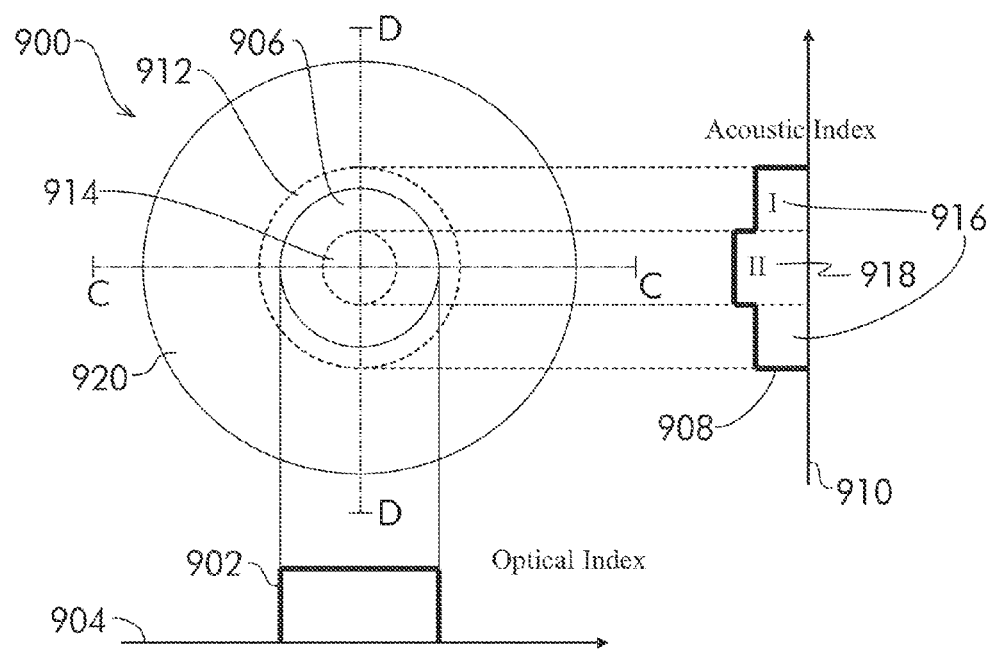
FIG. 9 is a cross-sectional view of an example fiber constructed according to an aspect of the present invention and tailored for a selected Brillouin response, having acoustic and optical profiles with two acoustic regions.

FIG. 9 is a cross-sectional view of an example fiber 900 constructed according to a further aspect of the present invention. Fiber 900 is adapted to exhibit plural Brillouin backscattering frequency-shift responses, at or excited by a single predominant optical wavelength. Each Brillouin frequency-shift response may react differently to temperature or strain. The availability of multiple Brillouin frequencies may help reduce the cost and complexity of measurement equipment. For example, a mixing or heterodyne product of two Brillouin frequencies can appear at a lower frequency and therefore be easier to detect and use than the fundamental signals. For another example, one or more of the Brillouin frequencies could be used as a frequency reference. As best seen in FIG. 9, fiber 900 may have different acoustic and optical profiles, defining plural optical and acoustic cores, the effective boundaries of which may differ. Curve 902 shows the relative variation of the optical index at various positions along a diametral cross-section line C-C through the fiber 900. An upward excursion in curve 902 from a baseline 904 indicates an increase in the optical index corresponding to positions in an optical core 906. Similarly, curve 908 shows the relative variation in the acoustic index at various positions along a diametral cross-section line D-D through the fiber 900. Curve 908 is rotated 90 degrees counter-clockwise from the conventional representation of curve 902, so that a leftward excursion in curve 908 from a baseline 910 indicates an increase in the acoustic index corresponding to positions in the acoustic cores 912 and 914. As best seen in FIG. 9, there is a first region 916 of elevated acoustic index corresponding to positions in an outer acoustic core 912, and a second region 918 of further elevated acoustic index corresponding to positions in an inner acoustic core 914. Thus, the optical core 906 and the outer and inner acoustic cores 912 and 914 are not coextensive. Each of the outer and inner acoustic cores 912 and 914 has different acoustic properties, and each is associated with a different Brillouin frequency-shift response to optical excitation at any particular wavelength. Cladding 920 is provided outside the cores. Fiber 900 may have multiple cladding regions, including inner cladding regions. It will be appreciated that distinctions between "core" and "cladding" are specific to each particular mode and modality of energy propagated through the fiber; for example, a region of the fiber that serves as an acoustic "core" may, effectively, be cladding with respect to optical propagation.

While the example fiber 900 of FIG. 9 has two central acoustic regions 916 and 918, in some embodiments the fiber may have more than two layers or regions. Moreover, embodiments constructed according to aspects of the invention may employ any suitable fiber architecture or design, including without limitation, including without limitation, step-like fiber, step index fiber, graded-index fiber, higher-order mode fiber, chirally-coupled core fiber, graded acoustic velocity fiber, single clad fiber, photonic crystal fiber, photonic bandgap fiber, hole-assisted fiber, air-clad fiber, or holey fibers. The profile of the index for optical or acoustic modes may be smooth or step-like, and may contain single and/or multiple core and cladding regions. Additionally, acoustic boundaries may lie within or outside of optical layers, optical and acoustic boundaries may or may not be co-located or coextensive, and the optical core and acoustic cores need not be the same size.

In order to construct an optical fiber such that at least one of its Stokes' frequency shifts associated with BBS is independent of either the temperature (T) or strain ($\sigma$), or that this dependency is minimized to an acceptable level, the materials and relative amounts must be properly selected. The frequency shift can be written as $$v_a(T, \sigma) = \frac{2n(T, \sigma)V_L(T, \sigma)}{\lambda_o} \quad (1)$$

where n is the index of refraction and $V_L$ is the acoustic velocity. In an optical fiber where both acoustic and optical waveguiding effects take place, the index and velocity are those of the optical and acoustic modes, respectively. By taking the derivative and setting it to zero, the following conditions are achieved to obtain a frequency shift that is either temperature- and/or strain-free $$-\frac{dn(T)}{dT}\frac{1}{n(T)} = \frac{dV_L(T)}{dT}\frac{1}{V_L(T)} \quad (2)$$

$$-\frac{dn(\sigma)}{d\sigma}\frac{1}{n(\sigma)} = \frac{dV_L(\sigma)}{d\sigma}\frac{1}{V_L(\sigma)} \quad (3)$$

respectively. The most desirable choice in this case could be a pure oxide material (such as only $SiO_2$) whose material properties match either Equation (2) or (3). However, most fibers are silica-based, and silica is known to not exhibit this behavior. In addition, pure materials do not usually exhibit behaviors that satisfy at least one of Equations (2) or (3). Thus, multiple constituents may be combined with a base material, such as silica, forming binary, ternary, etc. glass systems that give rise to materials with desirable properties (such as satisfying Equation 2 or 3). These pure materials may be combined in an additive way utilizing the theory in P. D. Dragic, "Simplified model for the effect of Ge doping on silica fibre acoustic properties," Electronics Letters, Vol. 45, pp. 256-257 (2009). for engineering the net material properties.

In an example embodiment of a fiber constructed according to aspects of the present invention, in order to achieve the conditions embodied by Equations 2 and 3 above:

1) One of the dopant, or constituent, materials must have a frequency-shift vs. temperature or strain curve that has a negative slope in the range where sensing is desired (such as $-100°$ C.$<T<100°$ C.). This depends on the application. In some cases, two or more dopants may be treated as a single unit cell if their bonding structures are altered when they are present simultaneously (such as $P_2O_5$ with $Al_2O_3$).

2) For at least one constituent, at least one of dn/dT and $dV_L/dT$ must be negative for an athermal fiber.

3) For at least one constituent, at least one of dn/dσ and $dV_L/\sigma$ must be negative for a fiber that does not react to strain (hereinafter referred-to as 'strain-free' fiber).

4) For a combination of two or more constituents, the concentrations must be correctly selected in order to achieve the desired strain or temperature dependence. The amounts of the constituents are selected so as to balance the slope or dependency contributions from the constituents, thereby reducing the aggregate dependency of the Brillouin frequency shift, with respect to a selected variable physical condition (such as temperature or strain), to zero, or to an acceptable application-specific level. The additive model can be used with good approximation. For binary glasses (with hypothetical dopants or constituents P and S where subscripts refer to bulk material values), this may be written as $$n = mn_P + (1-m)n_S \quad (4)$$

and $$V = \left(\frac{m}{V_P} + \frac{(1-m)}{V_S}\right)^{-1} \quad (5)$$

where $$m = \frac{\frac{\rho_S}{M_S}\frac{M_P}{\rho_P}[P]}{1 + [P]\left(\frac{\rho_S}{M_S}\frac{M_P}{\rho_P} - 1\right)} \quad (6)$$

and M and ρ are the molar mass and mass density, respectively, and [P] is the molar fraction of dopant P. While performance requirements may vary among applications for fibers which are designed to minimize sensitivity of Brillouin frequency shift to certain physical conditions, such as temperature or strain, it is believed that a slope of the Brillouin frequency-shift-versus-temperature curve of less than 250 kHz/K at 1550 nm, and a slope of the Brillouin frequency-shift-versus-strain curve of less than 125 Mhz/σ at 1550 nm, where σ is the % elongation, are suitable performance constraints for a commercial embodiment of a fiber to be useful in a measurement system.

In an example embodiment, such as that of fiber 500 of FIG. 5, the material 400 (FIG. 4) used to construct core 502 is determined according to the above process. In some embodiments, the core 502 and cladding 504 will be different materials. In yet another embodiment, the cladding 504 may be similar to the core material 502. In yet another embodiment, the optical core 502 and cladding 504 will have similar dn/dT or dn/dσ. It will be appreciated that the optical core 502 and cladding 504 cooperate to define an optical mode. The optical mode exhibits an effective modal index of refraction that is considered in Equation 1.

In some instances, it may be desirable to have more than one Brillouin frequency-shift response present in the fiber (at a fixed wavelength), with at least one of them being independent of strain or temperature. Thus, in a further example embodiment, the fiber will have more than one acoustic region with acoustic properties dissimilar to one another, and at least one of the regions has properties that follow the conditions described in 1)-4) above. An example fiber 900 of this general design is depicted in FIG. 9. Producing a fiber of this design with desirable properties requires compositionally tailoring both the optical index and acoustic velocity profiles. It may be desirable that the spatial overlap of the optical field with the acoustic field in regions 916 and 918 are substantially similar, or within about 25% of each other. In other words, it may be desirable to generate plural acoustic frequencies wherein the spatial overlaps are adjusted such that the strength of the interactions between the optical and the plural acoustic waves in the acoustic regions are similar.

According to a further aspect of the present invention, as a non-limiting example, a suitable optical-fiber core material composition is determined for which the Brillouin frequency shift is substantially independent of the temperature. The material selected is phosphorus oxide-doped silica. Given the large negative thermo-optic coefficient of $P_2O_5$ (See S. M. Tripathi, A. Kumar, R. K. Varshney, Y. B. P. Kumar, E. Marin, and J.-P. Meunier, "Strain and Temperature Sensing Characteristics of Single-Mode-Multimode-Single-Mode Structures," Journal of Lightwave Technology, Vol. 27, pp. 2348-2356 (2009)) and its smaller thermo-acoustic coefficient than silica, a composition may be found that will minimize the slope of the frequency versus temperature curve. The acoustic velocity as a function of temperature may be written $$v_a(T) = \frac{2n(T)V_L(T)}{\lambda_o}. \quad (7)$$

The acoustic velocity may be expressed in terms of the square root of the elastic modulus divided by the mass density. Taking the derivative and setting it to zero yields the following condition for a temperature-independent $v_a(T)$ $$-\frac{dn(T)}{dT}\frac{1}{n(T)} = \frac{dV_L(T)}{dT}\frac{1}{V_L(T)}. \quad (8)$$

Assuming that the derivatives are approximately constant over a small temperature range, Equation (8) simplifies to $$\frac{V_L(T)}{n(T)} = -\text{Constant}. \quad (9)$$

In general, this expression is difficult to satisfy for all T due to the dissimilarity in the functional forms of n and $V_L$. However, a range of temperatures can be found where the slope, $dv(T)/dT$, is minimized. First, the temperature-dependent forms of the acoustic velocity are assumed as $$v_a^{P_2O_5}(T) = 0.119(T-21.5° \text{ C.}) + 3936 \text{ m/s} \quad (10)$$

$$v_a^{SiO_2}(T) = 0.559(T-21.5° \text{ C.}) + 5965 \text{ m/s}. \quad (11)$$

It is assumed that over a small temperature range, $dn(T)/dT$ for pure $P_2O_5$ is a constant. Equation (7) for pure $P_2O_5$ then leads to a $v(T)$ that has a negative slope, while that of pure silica has a positive slope, thus suggesting a composition where these slopes are balanced.

To determine the temperature dependencies of the $P_2O_5$—$SiO_2$ mixture, the temperature-dependent physical properties of the individual pure constituents are used in the additive model described above, and the composition is adjusted until the frequency variation is minimized over the region $-100°$ C.$<$T$<100°$ C. Thus, the amounts of the constituents are selected such that the slope or dependency contributions from the constituents balance each other to reduce the aggregate dependency of the Brillouin frequency shift, with respect to a selected variable physical condition (e.g., temperature), to zero, or to an acceptable application-specific level. The result is shown in FIG. 8 for the molar composition $0.54P_2O_5$: $0.46SiO_2$. In the range $-100°$ C.$<$T$<100°$ C., the Brillouin frequency shift changes by less than 2 kHz per ° C. This is suitable for several applications, including but not limited to, distributed strain sensing on roads, bridges, and aging buildings in 'normal' environmental outside or inside temperatures.

Embodiments of optical fibers constructed according to aspects of the present invention may enable less-expensive traditional cabling of optical fiber in measurement systems, while eliminating the need for a second set of fiber and sensor electronics to distinguish between temperature and strain. These technologies are particularly important in the low-cost active monitoring of structural health of roads, bridges, rail, and aging buildings. They can also find uses in monitoring oil rigs, oil pipelines, gas pipelines and in other environments.

Thus, there has been disclosed embodiments of optical fibers constructed according to aspects of the present invention in which at least a portion or component of the fiber is made from a material which has more than one constituent. The constituents of the material are combined in proper quantities such that the slope or dependency contributions from the several constituents balance each other to reduce the slope of the aggregate Brillouin frequency-shift-versus-temperature or frequency-shift-versus-strain curve to zero, or to an acceptable application-specific level. In other words, the constituents and their quantities are selected such that the slope or dependency contributions from the constituents balance each other to reduce the aggregate dependency of the Brillouin frequency shift, with respect to a selected variable physical condition, to zero, or to an acceptable application-specific level. The fiber may also be constructed of regions of different materials. At least one of these materials has constituents that are combined in proper quantity such that the constituents balance each other to reduce the slope of the aggregate Brillouin frequency versus temperature or strain curve to zero, or to an acceptable application-specific level.

Although aspects of the present invention have been described as they may be applied to optical fibers in measurement systems, these are merely examples of ways in which the invention may be applied. The invention is not limited to these examples, and could be applied to many other environments.

The embodiments described herein are exemplary. Thus it will be appreciated that although the embodiments are described in terms of specific technologies, other equivalent technologies could be used to implement systems in keeping with the spirit of the present invention.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples discussed herein. The invention is not limited by the above described embodiment, method, and examples, but by any and all embodiments and methods within the scope of the invention.

What is claimed is:

1. An optical fiber comprising:
   at least one region enabling energy propagation through said fiber;
   said at least one region having at least first and second material constituents;
   said first material constituent providing a contribution to Brillouin-frequency-shift dependence on a variable physical condition of positive sign;
   said second material constituent providing a contribution to Brillouin-frequency-shift dependence on said variable physical condition of negative sign;
   said second constituent being present in an amount that balances said contributions from said first and second constituents to Brillouin-frequency-shift dependence of said at least one region with respect to said variable physical condition.

2. The optical fiber of claim 1, wherein:
one of said material constituents is $SiO_2$; and
at least one of said material constituents is selected from the group consisting of $GeO_2$, $P_2O_5$, $Al_2O_3$, $B_2O_3$, and F.

3. The optical fiber of claim 1 wherein said at least one region is an optical core region.

4. The optical fiber of claim 1 wherein said at least one region is an acoustic core region.

5. The optical fiber of claim 1 wherein said at least one region is an optical cladding region.

6. The optical fiber of claim 1 wherein said at least one region is an acoustic cladding region.

7. The optical fiber of claim 3 further comprising at least one cladding region, said cladding having at least one material constituent differing in abundance or species from said material constituents of said core region.

8. The optical fiber of claim 1 characterized by at least first and second Brillouin frequency shifts at a single optical wavelength, wherein dependence on said variable physical condition of said first and second Brillouin frequency shifts are different.

9. The optical fiber of claim 1 comprising at least two acoustic regions.

10. The optical fiber of claim 1 wherein said variable physical condition is temperature.

11. The optical fiber of claim 10, at least one of said material constituents being characterized by at least one of derivative with respect to temperature of index of refraction and derivative with respect to temperature of acoustic velocity being negative-valued.

12. The optical fiber of claim 10, said first and second material constituents being present in respective relative amounts such that aggregate Brillouin-frequency-shift dependence of said at least one region on temperature is less than 250 kHz/K at 1550 nm.

13. The optical fiber of claim 1 wherein said variable physical condition is strain.

14. The optical fiber of claim 13, at least one of said material constituents being characterized by at least one of derivative with respect to strain of index of refraction and derivative with respect to strain of acoustic velocity being negative-valued.

15. The optical fiber of claim 13, said first and second material constituents being present in respective relative amounts such that aggregate Brillouin-frequency-shift dependence of said at least one region on strain is less than 125 MHz/percent elongation at 1550 nm.

16. A method of producing an optical fiber including at least one region enabling energy propagation therethrough, comprising:
selecting a first material constituent which provides a positive-signed contribution to Brillouin-frequency-shift dependence on a variable physical condition;
selecting a second material constituent which provides a negative-signed contribution to Brillouin-frequency-shift dependence on said variable physical condition;
selecting respective relative abundance of said first and second material constituents so as to balance said contributions from said first and second constituents to Brillouin-frequency-shift dependence of said at least one region with respect to said variable physical condition; and
providing in said fiber at least one region comprising at least said first and second material constituents in said selected relative abundance.

17. The method of claim 16 further comprising selecting as one of said first and second constituents a material characterized by at least one of derivative with respect to temperature of index of refraction and derivative with respect to temperature of acoustic velocity being negative-valued.

18. The method of claim 16 further comprising selecting respective relative abundance of said first and second material constituents such that aggregate Brillouin-frequency-shift dependence of said at least one core region on temperature is less than 250 kHz/K at 1550 nm.

19. The method of claim 16 further comprising selecting as one of said first and second constituents a material characterized by at least one of derivative with respect to strain of index of refraction and derivative with respect to strain of acoustic velocity being negative-valued.

20. The method of claim 16 further comprising selecting respective relative abundance of said first and second material constituents such that aggregate Brillouin-frequency-shift dependence of said at least one core region on strain is less than 125 MHz/percent elongation at 1550 nm.

* * * * *